Patented Aug. 13, 1946

2,405,886

UNITED STATES PATENT OFFICE 2,405,886

NEW PRODUCTS

Albert F. Hardman, Akron, Ohio, assignor to Wingfoot Corporation, Akron, Ohio, a corporation of Delaware No Drawing. Application May 2, 1942,
Serial No. 441,527

1 Claim. (Cl. 260—566)

This invention relates to new products which are brilliantly colored and suitable for dyes and for the preparation of pigments, as, for example, pigments to be used for coloring rubber. It includes the preparation of the new products on fabrics.

The new products of this invention have the following formula:

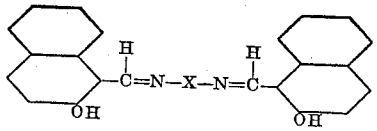

where X is a para-aromatic group, such as a single arylene nucleus or two aryl groups joined to each other by a single bond or two aryl groups joined by a methylene group. The aromatic groups may be substituted or unsubstituted.

These new compounds may be formed by reacting a para-aromatic diamine with two molecular proportions of the 2-hydroxy-naphthaldehyde. The products have a very low solubility in the ordinary organic solvents. They have a high melting point ranging well above 200° C., and they are brightly colored. The following may be mentioned as typical:

di(2-hydroxy-naphthal) p-phenylene-diamine
di(2-hydroxy-naphthal) benzidine
di(2-hydroxy-naphthal) p-p', diamino-diphenyl-methane The first of these three products occurs as brilliant red crystals having a melting point of about 280° C. The second is an orange-colored crystalline material melting at 300-305° C. The third occurs as bright yellow crystals melting at 245–6° C. The solubility of each of these materials in hot alcohol, benzene and other common solvents is quite small.

The crystals may be obtained in a very finely divided condition and as such have excellent covering power when mixed in such a medium as rubber. When subjected to hot vulcanization, the colors of the first two compounds fade considerably, but the third compound is quite resistant to the effects of hot vulcanization, and its bright yellow color is permanent.

The colors may be used for dying fabrics, such as cotton cloth. For example, the cotton fabric may be first immersed in a dilute solution of the 2-hydroxy-1-naphthaldehyde and then in an aqueous solution of the acetate or other salt of a diamine. The colors thus developed on the cloth are fast to boiling in soap solutions.

If the fabric, after it has been impregnated with the aldehyde, is printed with one or more of the various diamines, a design may be developed, and where different diamines are used different colors are produced. After printing the excess aldehyde may be removed by washing.

The range of colors obtained may be widened by employing as the amine a nitro-substituted or halogen-substituted or hydroxyl-substituted or alkyl-substituted compound, as for example, di-o-methyl-p.p'diamino-diphenyl-methane, nitro-benzidine, m-toluene-diamine, naphthylene-diamine, chloro-phenylene-diamine, diamino phenol, nitro-diamino-diphenyl methane, diamino-triphenyl-methane, diamino-azo-benzene, etc.

The new products may be produced by condensing the diamine with two molecular proportions of the 2-hydroxy-naphthaldehyde. Alternatively it may be produced from the dithio acid or from a naphthal aniline. The following examples are illustrative:

Example 1

This reaction is illustrated by the following equation:

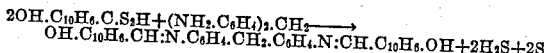

The following materials are mixed:

| | |
|---|---|
| p,p'-diamino-diphenyl-methane | g__ 10 |
| Alcohol | c.c__ 150 |
| 2-OH-dithionaphthoic acid | g__ 22 |

The mixture was refluxed. H₂S came off rapidly and a voluminous, yellow suspension was formed. This was filtered off and washed with alcohol. Since this product was insoluble in hot alcohol, it also contained crystals of free sulfur formed in the reaction. If desired, the sulfur can be removed by extraction with hot acetone or benzene, or by recrystallization from a high-boiling solvent, such as diphenyl-ether. This method of producing a naphthylidene-amine is covered by my copending application Serial No. 441,528, filed May 2, 1942, now matured into U. S. Patent #2,328,802.

Example 2

The following materials were mixed:

| | |
|---|---|
| 2-OH-naphthal-aniline | g__ 12.5 |
| Alcohol | c.c__ 100 |
| p-p'-diamino-diphenyl methane | g__ 6 |

The reaction mixture was refluxed. A yellow suspension formed in a few seconds. After 10–15 minutes it was filtered hot, and the precipitate was washed with alcohol. M. P. 225–30°.

What I claim is:

A brightly-colored compound having the formula: OH.C₁₀H₆.CH:N.R.N:CH.C₁₀H₆OH where R is methylene di(p-phenylene) and in which OH—C₁₀H₆— is alpha-(2-hydroxy naphthyl).

ALBERT F. HARDMAN.